United States Patent
Oka et al.

(10) Patent No.: US 10,021,376 B2
(45) Date of Patent: Jul. 10, 2018

(54) THREE-DIMENSIONAL DISPLAY DEVICE

(71) Applicant: Japan Display Inc., Tokyo (JP)

(72) Inventors: Shinichiro Oka, Tokyo (JP); Kouichi Shirai, Tokyo (JP); Takahiro Ochiai, Tokyo (JP); Amane Higashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 363 days.

(21) Appl. No.: 14/736,821

(22) Filed: Jun. 11, 2015

(65) Prior Publication Data
US 2015/0365655 A1 Dec. 17, 2015

(30) Foreign Application Priority Data
Jun. 11, 2014 (JP) .................... 2014-120623

(51) Int. Cl.
  *G02F 1/1335* (2006.01)
  *H04N 13/04* (2006.01)
  *G02F 1/1343* (2006.01)

(52) U.S. Cl.
  CPC ... *H04N 13/0409* (2013.01); *G02F 1/134309* (2013.01); *H04N 13/0484* (2013.01); *H04N 2213/001* (2013.01)

(58) Field of Classification Search
  CPC .................. G02B 27/2214; H04N 13/0409
  USPC ............................................. 349/15
  See application file for complete search history.

(56) References Cited

U.S. PATENT DOCUMENTS

| 2009/0002267 A1* | 1/2009 | Nam ............ G02B 27/2214 345/6 |
| 2012/0001890 A1* | 1/2012 | Kook ........... G02B 27/2214 345/212 |
| 2013/0127842 A1* | 5/2013 | Lee ............. G06T 15/00 345/419 |

FOREIGN PATENT DOCUMENTS

| JP | 2009-009081 A | 1/2009 |
| JP | 2014-066956 A | 4/2014 |

OTHER PUBLICATIONS

Shinichiro Oka et al, Crosstalk Reduction of 3D LCDs based on Analysis of LC Graded-Index (GRIN) Lens Factors, SID'12 DIGEST 29.3, 2012, p. 387-390, ISSN 0097-966X/12/4301-0387.
Japanese Office Action dated Feb. 27, 2018 for the corresponding Japanese Patent Application No. 2014-120623.

* cited by examiner

*Primary Examiner* — Thanh-Nhan P Nguyen
(74) *Attorney, Agent, or Firm* — Typha IP LLC

(57) ABSTRACT

Second barrier electrodes are arranged under first barrier electrodes so as to fill gaps between the first barrier electrodes, while an insulating layer is located between the first barrier electrodes and the second barrier electrodes. The number of first barrier electrodes and the number of second barrier electrodes in each barrier pitch are 6 or more. The positions of the barriers formed by the first barrier electrodes and the second barrier electrodes are controlled by the reception of a signal representing detected positions of the eyes of a viewer. If pitches of the first barrier electrodes are defined as BE, and the widths of regions in which the first barrier electrodes are overlapped with the second barrier electrodes are defined as BA, a ratio BA/BE of the widths BA to the pitches BE are 0.3 or smaller. This configuration can suppress the occurrence of moire.

6 Claims, 8 Drawing Sheets

OFF

ON

THREE-DIMENSIONAL DISPLAY DEVICE

CLAIM OF PRIORITY

The present application claims priority from Japanese Patent Application JP 2014-120623 filed on Jun. 11, 20014, the content of which is hereby incorporated by reference into this application.

BACKGROUND OF THE INVENTION

1. Field of the Invention

The present invention relates to a three-dimensional image display device using a liquid crystal parallax barrier panel.

2. Description of the Related Art

As a method for displaying a three-dimensional image without using glasses, a parallax barrier scheme is known. The parallax barrier scheme is a method in which a plate, called a parallax barrier panel, having multiple thin slits extending in the vertical direction is prepared. An image to be seen by the right eye and that by the left eye are each cut into a vertically-long, strip-shaped rectangle. Then, the cut images for both eyes are alternately arranged at the back of the parallax barrier panel. The images are thereby displayed as a three-dimensional image through the parallax barrier. The liquid crystal parallax barrier panel that includes liquid crystal can easily switch its display mode between two-dimensional display and three-dimensional display.

JP-2009-9081-A describes a liquid crystal parallax barrier panel including first barrier electrodes, second barrier electrodes, and an insulating layer formed therebetween to thereby providing a two-layer structure. Such a configuration enables the panel to maintain a certain resolution in displaying a three-dimensional image. In addition, JP-2009-9081-A describes the configuration in which each of the second barrier electrodes formed on a lower layer has a width larger than a gap between the first electrodes.

The parallax barrier scheme has a problem called "crosstalk" in which a pixel for the right eye is recognized by the left eye. A method for measuring the crosstalk is described in a non-patent document "S. Oka, et. Al. "Crosstalk Reduction of 3D LCDs based on Analysis of LC Graded-Index (GRIN) Lens Factors." SID' 12, digest 29.3, (2012), p. 387".

SUMMARY OF THE INVENTION

The liquid crystal parallax barrier panel has the advantage that it can easily switch between a two-dimensional image and a three-dimensional image when necessary. Specifically, the three-dimensional image is displayed by applying a barrier signal to the liquid crystal which forms a barrier pattern, whereas the two-dimensional image is displayed if no barrier signal is applied to the liquid crystal.

The parallax barrier scheme has a problem that the crosstalk occurs upon a movement of a viewpoint. The crosstalk is a phenomenon in which a pixel that should be seen by only the left eye is seen by the right eye, for example.

To prevent this, there is a scheme in which a camera tracks the positions of the eyes and the position of a barrier is controlled according to the positions of the eyes so that crosstalk is suppressed. This scheme is called an eye tracking scheme. In this scheme, the positions of the barrier electrodes needs to be finely controlled.

In conventional techniques, pitches of the barrier electrodes are approximately twice as large as pitches P of pixels included in a liquid crystal display panel, whereas the widths of the barrier electrodes are nearly equal to the pitches of the pixels. However, the eye tracking needs to control the barrier electrodes prepared in a manner separated into many pieces. To provide such a configuration, the barrier electrodes may formed into a two-layer structure including upper-layer electrodes (first barrier electrodes) and lower-layer electrodes (second barrier electrodes), and an insulating layer located therebetween. The first barrier electrodes and the second electrodes are both formed in a stripe shape, and arranged alternately with each other.

In this configuration, there are regions in which the first barrier electrode overlaps with the second barrier electrode. In the regions in which the first barrier electrodes are overlapped with the second barrier electrodes, transmittances are low. If such regions with low transmittances locate periodically, moire occurs on the display panel. The moire reduces the quality of an image and thus needs to be avoided.

An object of the invention is to achieve a liquid crystal parallax barrier panel that uses an eye tracking scheme suppressing crosstalk and that is capable of suppressing the occurrence of moire.

The invention has been devised to solve the aforementioned problems, and specific details are described below.

(1) A three-dimensional display device comprising:
a display panel; and
a liquid crystal parallax barrier panel arranged on the display panel, the liquid crystal parallax barrier panel changing positions of its barriers in accordance with a change in positions of viewer's eyes, wherein:
the display panel includes pixels arranged at a first pitch of P in a first direction, the pixels each having a first sub-pixel, a second sub-pixel, and a third sub-pixel which are arranged in the first direction;
on the liquid crystal parallax barrier panel, the barriers extend in a second direction perpendicular to the first direction and are arranged at a second pitch in the first direction;
the barriers of the liquid crystal parallax barrier panel include
first barrier electrodes extending in the second direction and arranged in the first direction at a pitch of BE, and
second barrier electrodes extending, under the first barrier electrodes through an insulating layer disposed therebetween, in the second direction and arranged at a pitch of BE in the first direction;
a number of first barrier electrodes within 2P is 6 or more, and a number of second barrier electrodes within 2P is 6 or more;
the second barrier electrodes are formed to be overlapped with the first barrier electrodes in the first direction so that the second barrier electrodes fill gaps between the first barrier electrodes in a plan view; and
when a width of each of first barrier electrodes overlaps with each of the second barrier electrodes is defined as BA, a ratio BA/BE is 0.3 or smaller.

(2) A three-dimensional display device comprising:
a display panel; and
a liquid crystal parallax barrier panel arranged on the display panel, the liquid crystal parallax barrier panel changing positions of its barriers according to a change in positions of viewer's eyes, wherein:

the display panel includes pixels arranged at a first pitch of P in a first direction, the pixels each having a first sub-pixel, a second sub-pixel, and a third sub-pixel which are arranged in the first direction;

on the liquid crystal parallax barrier panel, the barriers extends in a second direction perpendicular to the first direction and are arranged at a second pitch in the first direction;

the barriers of the liquid crystal parallax barrier panel include first barrier electrodes extending in the second direction and arranged in the first direction at a pitch of BE, and second barrier electrodes extending, under the first barrier electrodes through an insulating layer disposed therebetween, in the second direction and arranged at a pitch of BE in the first direction;

a number of first barrier electrodes within 2P is 6 or more, and a number of second barrier electrodes within 2P is 6 or more;

the second barrier electrodes are formed within gaps between the first barrier electrodes; and when a space between each of the first barrier electrodes and each of the second barrier electrodes in the first direction in a plan view is BB, a ratio BB/BE is 0.3 or smaller.

(3) A three-dimensional display device comprising:

a display panel; and a liquid crystal parallax barrier panel arranged on the display panel, the liquid crystal parallax barrier panel changing positions of its barriers in accordance with a change in positions of viewer's eyes, wherein:

the display panel includes pixels arranged at a first pitch of P in a first direction, the pixels each having a first sub-pixel, a second sub-pixel, and a third sub-pixel which are arranged in the first direction;

on the liquid crystal parallax barrier panel, the barriers extend in a second direction perpendicular to the first direction and are arranged at a second pitch in the first direction;

the barriers of the liquid crystal parallax barrier panel include first barrier electrodes extending in the second direction and arranged in the first direction at a pitch of BE, and second barrier electrodes extending, under the first barrier electrodes through an insulating layer disposed therebetween, in the second direction and arranged at a pitch of BE in the first direction;

when a number of first barrier electrodes in 2P is defined as S, and a distance between the center of a liquid crystal layer of the liquid crystal display panel and the center of a liquid crystal layer of the liquid crystal parallax barrier panel is defined as Lg, $S \geq 2P/[(Lg/1.5)\tan 5]$ is satisfied;

the second barrier electrodes are formed to be overlapped with the first barrier electrodes in the first direction; and when a width that each of the first barrier electrodes overlaps with each of the second barrier electrodes is defined as BA, a ratio BA/BE is 0.3 or smaller.

(4) A three-dimensional display device comprising:

a display panel; and a liquid crystal parallax barrier panel arranged on the display panel, the liquid crystal parallax barrier panel changing positions of its barriers in accordance with a change in positions of viewer's eyes, wherein:

the display panel includes pixels arranged at a first pitch of P in a first direction, the pixels each having a first sub-pixel, a second sub-pixel, and a third sub-pixel which are arranged in the first direction;

on the liquid crystal parallax barrier panel, the barriers extend in a second direction perpendicular to the first direction and are arranged at a second pitch in the first direction;

the barriers of the liquid crystal parallax barrier panel include first barrier electrodes extending in the second direction and arranged in the first direction at a pitch of BE, and second barrier electrodes extending, under the first barrier electrodes through an insulating layer disposed therebetween, in the second direction and arranged at a pitch of BE in the first direction;

when a number of first barrier electrodes in 2P is defined as S, and a distance between the center of a liquid crystal layer of the liquid crystal display panel and the center of a liquid crystal layer of the liquid crystal parallax barrier panel is defined as Lg, $S \geq 2P/[(Lg/1.5)\tan 5]$ is satisfied;

the second barrier electrodes are formed within gaps between the first barrier electrodes; and when a width of a space between each of the first barrier electrodes and each of the second barrier electrodes in a plan view is defined as BB, a ratio BB/BE is 0.3 or smaller.

(5) A three-dimensional display device comprising:

a display panel; and a liquid crystal parallax barrier panel arranged on the display panel, the liquid crystal parallax barrier panel changing positions of its barriers in accordance with a change in positions of viewer's eyes, wherein:

the display panel includes pixels arranged at a first pitch of P in a first direction, the pixels each having a first sub-pixel, a second sub-pixel, and a third sub-pixel which are arranged in the first direction;

on the liquid crystal parallax barrier panel, the barriers extend in a second direction perpendicular to the first direction and are arranged at a second pitch in the first direction;

the barriers of the liquid crystal parallax barrier panel include first barrier electrodes extending in the second direction and arranged in the first direction at pitches of BE, and second barrier electrodes extending, under the first barrier electrodes through an insulating layer disposed therebetween, in the second direction and arranged at a pitch of BE in the first direction;

a number of first barrier electrodes within 2P is 6 or more, and a number of second barrier electrodes within the barrier pitch 2P is 6 or more;

each of the first barrier electrodes overlaps with each of the second barrier electrodes with a width of BA in the first direction in a plan view in one side, and each of the first barrier electrodes has a space of BB with each of the second barrier electrode in the first direction in a plan view in opposite side, a ratio BA/BE is 0.3 or smaller and a ratio BB/BE is 0.3 or smaller.

(6) A three-dimensional display device comprising:

a display panel; and a liquid crystal parallax barrier panel arranged on the display panel, the liquid crystal parallax barrier panel changing positions of its barriers in accordance with a change in positions of viewer's eyes, wherein:

the display panel includes pixels arranged at a first pitch of P in a first direction, the pixels each having a first sub-pixel, a second sub-pixel, and a third sub-pixel which are arranged in the first direction;

on the liquid crystal parallax barrier panel, the barriers extend in a second direction perpendicular to the first direction and are arranged at a second pitch in the first direction;

the barriers of the liquid crystal parallax barrier panel include first barrier electrodes extending in the second direction and arranged in the first direction at a pitch of BE, and second barrier electrodes extending, under the first barrier electrodes through an insulating layer disposed therebetween, in the second direction and arranged at a pitch of BE in the first direction;

when a number of first barrier electrodes in 2P is defined as S, and a distance between the center of a liquid crystal layer of the liquid crystal display panel and the center of a liquid crystal layer of the liquid crystal parallax barrier panel is defined as Lg, S≥2P/[(Lg/1.5)tan 5] is satisfied;

each of the first barrier electrodes overlaps with the second barrier electrodes with a width of BA in the first direction in a plan view at one side, and each of the first barrier electrodes has a space of BB with each of the second barrier electrode in the first direction in a plan view in opposite side, a ratio BA/BE is 0.3 or smaller and a ratio BB/BE is 0.3 or smaller.

According to the invention, a three-dimensional image display device including a liquid crystal parallax barrier panel is provided. The three-dimensional image display device suppresses crosstalk to a low level amount even upon a movement of a viewpoint and suppresses the occurrence of moire, to thereby obtain a high-quality image.

DESCRIPTION OF THE PREFERRED EMBODIMENTS

Hereinafter, the invention is described using embodiments in detail.

First Embodiment

Figure 1:
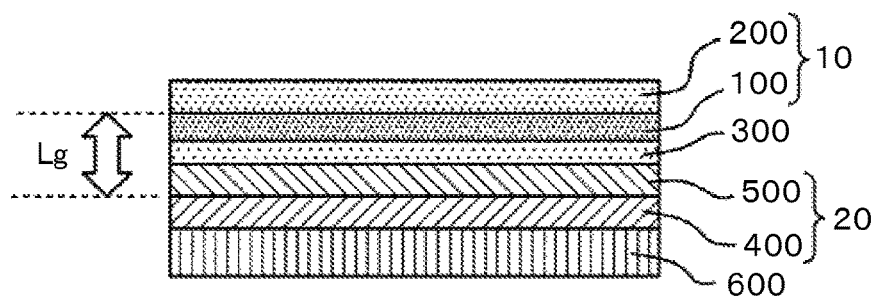
FIG. 1 is a cross-sectional schematic diagram of a three-dimensional image display device according to the invention.

FIG. 1 is a cross-sectional schematic diagram of a three-dimensional image device according to the invention. The device illustrated in FIG. 1 uses a liquid crystal parallax barrier panel 10 to enable an image formed by a liquid crystal display panel 20 to be visually recognized as a three-dimensional image. The liquid crystal parallax barrier panel 10 and the liquid crystal display panel 20 are bonded to each other by a bonding member 300. A transparent bonding member such as acrylic resin is used as the bonding member 300.

In FIG. 1, the liquid crystal panel 20 is used, but may be replaced with an organic electroluminescence display device (organic light-emitting diode; OLED) or the like. In addition, the liquid crystal display panel may be of any of an IPS type, a VA type, a TN type, and the like. The IPS type is superior in terms of a viewing angle characteristic and suitable for three-dimensional image display of a parallax barrier scheme. In FIG. 1, a distance between the center of a liquid crystal layer of the liquid crystal display panel 20 and the center of a liquid crystal layer of the liquid crystal parallax barrier panel 10 is Lg.

The liquid crystal display panel 20 has a configuration in which liquid crystal is sandwiched and held between a TFT substrate 400 and an opposing substrate 500, while the TFT substrate 400 has pixels provided with TFTs and pixel electrodes and formed in a matrix. The liquid crystal parallax barrier panel 10 has a configuration in which liquid crystal is sandwiched and held between a barrier substrate 100 having barrier electrodes 110 formed therein and a common substrate 200 having a common electrode 210 formed therein. Although not illustrated in FIG. 1, a lower polarizing plate is arranged under the liquid crystal display panel 20, a middle polarizing plate is arranged on the top of the liquid crystal display panel 20, and an upper polarizing plate is arranged on the top of the liquid crystal parallax barrier panel 10.

Since the liquid crystal display device itself does not emit light, a backlight 600 is arranged on a back surface of the liquid crystal display panel. The backlight 600 includes a light source, a light guide plate, and a diffuser plate and may include an optical part such as a prism sheet for improving a light use efficiency.

Figure 2:
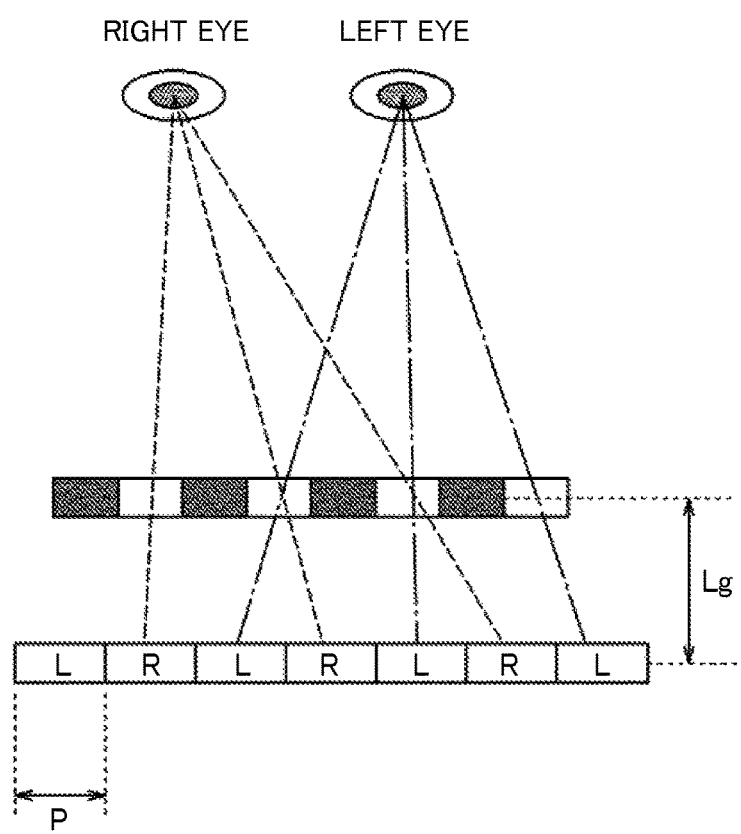
FIG. 2 is a cross-sectional schematic diagram describing a principle of a parallax barrier scheme.

FIG. 2 is a cross-sectional diagram describing a principle of three-dimensional image display of the parallax barrier scheme. Due to a barrier region and an opening region that are formed in the liquid crystal parallax barrier panel, the right eye recognizes only a image R formed for the right eye in the display device, the left eye recognizes only an image L formed for the left eye in the display device, and thus a person can recognize a three-dimensional image.

Figure 3A:
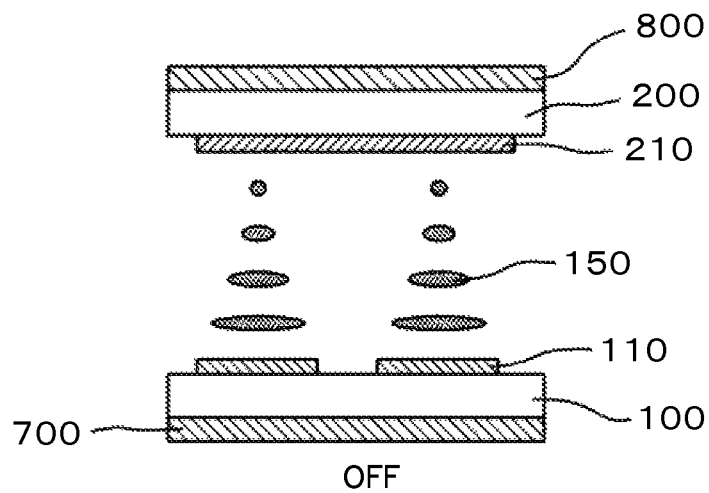
FIG. 3A is a cross-sectional diagram of a liquid crystal parallax barrier panel when a barrier is not formed.
Figure 3B:
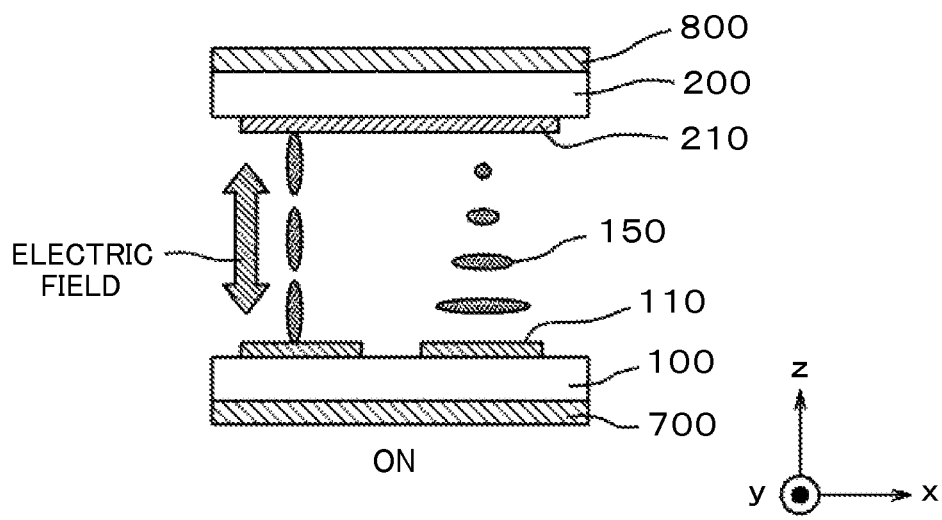
FIG. 3B is a cross-sectional diagram of the liquid crystal parallax barrier panel when the barrier is formed.

FIGS. 3A and 3B are cross-sectional diagrams describing operations of the liquid crystal parallax barrier panel. The liquid parallax barrier panel illustrated in FIGS. 3A and 3B is of a normally-white TN type in which light passes through the panel when a signal is not applied. Although the liquid crystal parallax barrier panel may be of a normally-black TN type, a transmittance of the normally-white TN type is larger than a transmittance of the normally-black TN type. Thus, the normally-white TN type is suitable for the liquid crystal parallax barrier panel. Although the TN type is described as the liquid crystal parallax barrier panel in this specification, a liquid crystal panel of another operational type may be used as long as a barrier pattern can be formed.

FIG. 3A illustrates a case where a signal is not applied to the barrier electrodes 110. In FIG. 3A, on the barrier substrate 100, the barrier electrodes 110 extend in a direction perpendicular to the sheet of FIG. 3A and are each formed in a stripe shape. A common electrode 210 is formed in a plate-like shape on the common substrate 200. A middle polarizing plate 700 is arranged under the barrier substrate 100, while an upper polarizing plate 800 is arranged on the common substrate 200. The middle polarizing plate 700 serves as a lower polarizing plate for a normal liquid crystal display.

In the case illustrated in FIG. 3A, light emitted from the liquid crystal display panel is not modulated by the liquid crystal parallax barrier panel. Thus, an image displayed on the liquid crystal display panel is recognized as a two-dimensional image. FIG. 3B illustrates a case where a signal is applied to the barrier electrodes 110 and a barrier pattern is formed. A configuration illustrated in FIG. 3B is the same as described with reference to FIG. 3A. In a liquid crystal layer located in a space in which the signal is applied to the barrier electrodes 110, liquid crystal molecules are vertically oriented so as to lose an optical rotation property and block light transmitted from the backlight. In this manner, the position of the barrier pattern can be controlled by applying a voltage to the barrier electrodes 110.

A problem with the parallax barrier scheme is that when the positions of the eyes change, angles at which the left eye or the right eye sees pixels change and pixels to be visually recognized by only the right eye can be visually recognized by the left eye or so-called crosstalk occurs, for example. To take measures against the crosstalk, the positions of barriers are changed in accordance with the movements of the eyes. To perform this operation, first of all, it is necessary to recognize the positions of the eyes. This is referred to as eye tracking.

Figure 12:
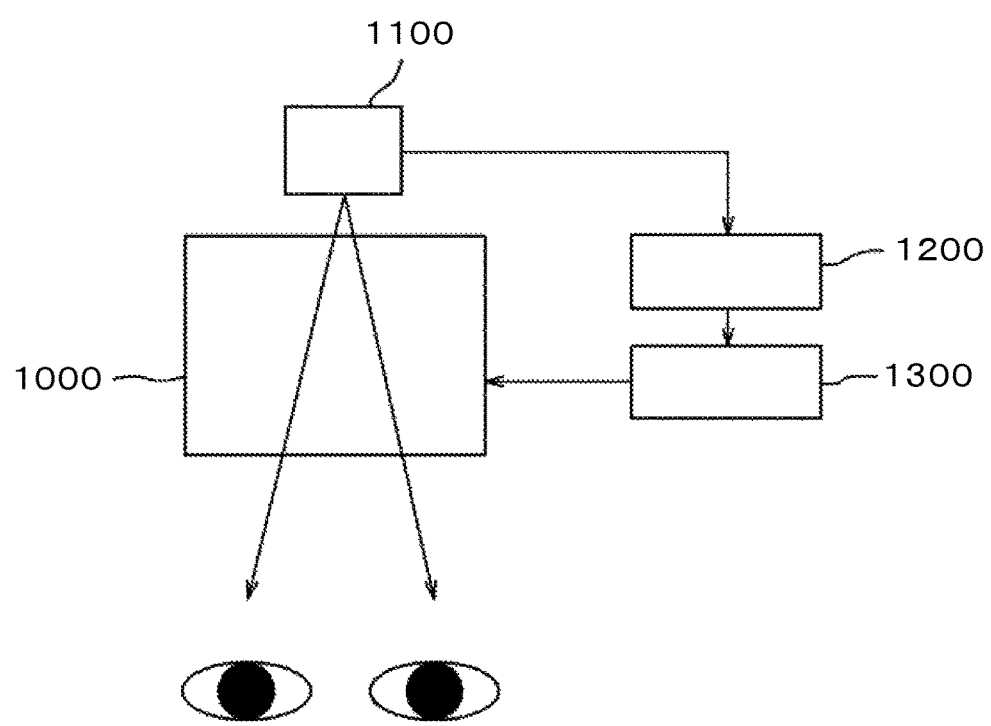
FIG. 12 is a schematic diagram illustrating an eye tracking system.

FIG. 12 is a diagram illustrating a configuration for the eye tracking. In FIG. 12, a camera 1100 measures the positions of the eyes of a person and transfers data of the measured positions to a position detector 1200. The position detector 1200 generates data representing the positions of the eyes and transfers the generated data to a barrier controller 1300. The barrier controller 1300 generates a signal for barrier electrodes in order to form the barriers and transmits the signal to a three-dimensional display device 1000 having the liquid crystal parallax barrier panel. The three-dimensional display device 1000 displays a three-dimensional image based on movements of the eyes. Although the camera detects the positions of the eyes in this specification, another technique that uses an infrared ray, an ultrasonic wave, or the like may be used to obtain effects of the invention.

Figure 4:
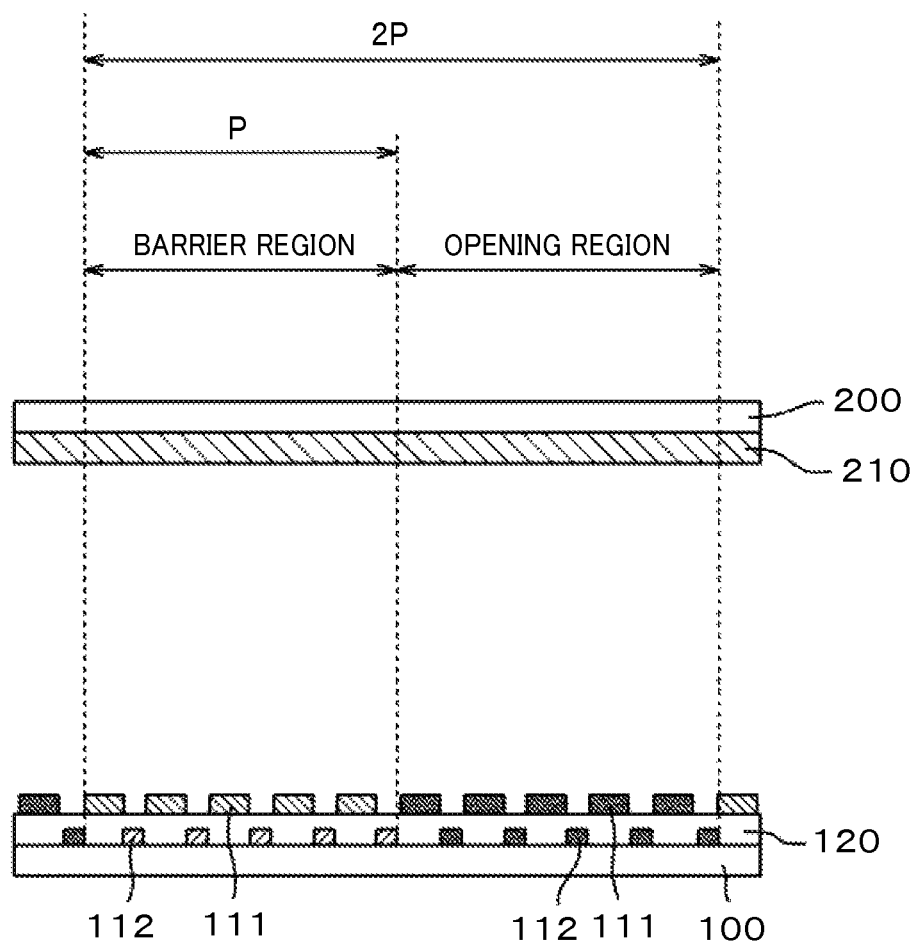
FIG. 4 is a cross-sectional diagram of the liquid crystal parallax barrier panel according to the invention.

FIG. 4 is a cross-sectional diagram illustrating the liquid parallax barrier panel to which the invention is applicable and that is included the three-dimensional display device. The width of the barrier region that blocks light is P, while a pitch of each of the barriers is approximately 2P. P represents pitches P of the pixels included in the liquid crystal display panel. That is, the pitch of the barrier is approximately twice as large as the pitches of the pixels. Although the width of the barrier region is P in FIG. 4, the width of the barrier region may be larger than P.

In FIG. 4, a voltage is applied to part of barrier electrodes 111 and 112 drawn by rough hatch. This part blocks light, thus corresponds to a region on which a barrier is formed. In contrast, a voltage is not applied to part of barrier electrodes 111 and 112 drawn by deep hatch, which part allows light to pass therethrough. Thus, this part corresponds to an opening region.

In FIG. 4, the barrier region is formed by the five first barrier electrodes 111, and the opening region is also formed by the five other first barrier electrodes 111. The second barrier electrodes 112 fill gaps between the first barrier electrodes 111. The second barrier electrodes 112 are arranged so as to prevent pixel information from leaking from the gaps between the first barrier electrodes 111 and prevent the occurrence of crosstalk. In FIG. 4, the common substrate 200 provided with the common electrode 210 is arranged opposite to the barrier substrate 100 so that the liquid crystal layer is located between the common substrate 200 and the barrier substrate 100. The common electrode 210 is formed in a plate-like shape on the common substrate 200 and common to the barrier electrodes.

Figure 5A:
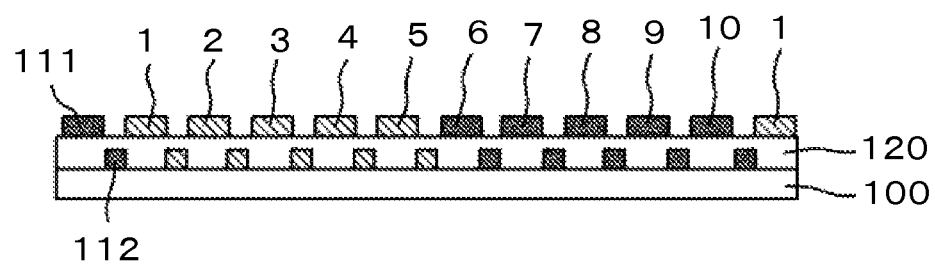
FIG. 5A is a cross-sectional diagram illustrating a configuration of barrier electrodes according to the invention.
Figure 5B:
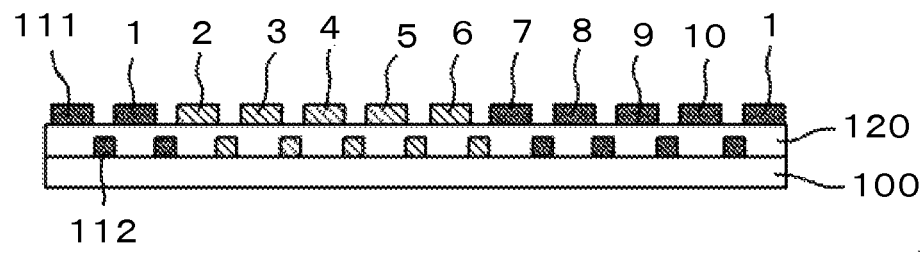
FIG. 5B is a cross-sectional diagram illustrating the configuration of the barrier electrodes according to the invention when the position of the barrier is changed.

FIGS. 5A and 5B are cross-sectional diagrams of the barrier substrate 100 in a case where the position of the barrier pattern is changed in the liquid crystal parallax barrier panel. FIG. 5A illustrates the same barrier substrate 100 as illustrated in FIG. 4. FIG. 5B is the cross-sectional diagram of the barrier substrate 100 when the position of the barrier pattern is changed by P/10 in accordance with changes in the positions of the eyes.

First barrier electrodes 111 illustrated in FIG. 5B which are turned on and turned off are shifted right by a distance corresponding to a width of one barrier electrode 111 from first barrier electrodes 111 illustrated in FIG. 5A which are turned on or turned off. In such a configuration, if a distance between the eyes is B and the eyes move by a distance of 2B/10, the amount of crosstalk is the same as an amount before the movements of the eyes.

If the barrier electrodes 111 that form the barrier region are not separated and form a single barrier electrode, the position of the barrier pattern is not changed and the amount of crosstalk increases with the movements of the eyes. On the other hand, using the barrier electrodes 111 being separated from each other as illustrated in FIGS. 5A and 5B, if the movement distance of the eyes is smaller than the pitches of the barrier electrodes, the amount of crosstalk also increases with the movements of the eyes. The amount of crosstalk, however, is smaller than an amount in the case of the single barrier electrode.

Evaluation of the numbers of the separated barrier electrodes 111 and 112 is described with reference to FIGS. 5A and 5B. As illustrated in FIG. 5A where the barrier is divided into the 10 first barrier electrodes 111, voltages are applied to five barrier electrodes 111 so that a black image is displayed. If the five barrier electrodes 111 have the same potential as the common electrode, a white image is displayed. The barrier is changed from a state in which the voltage is applied to the first barrier electrodes 111 represented by 1 to 5, as shown in FIG. 5A, to a state in which the voltage is applied to the first barrier electrodes 111 represented by 2 to 6, as shown in FIG. 5B, according to the movements of the eyes. In this case, the optimal position for visual recognition is changed, and an angle at which the eyes see the panel after the movements is defined as an optimal visual distance movement angle θB for a single viewpoint.

If the number of separated barrier electrodes is large and a ratio of the width of the barrier region and the width of the opening region is 1:1, the optimal visual distance movement angle θB for a single viewpoint can be defined by the following equation using the pitches P of the pixels that are included in the display panel and to be seen by the right eye or left eye, the number S of the separated barrier electrodes, and the distance Lg between the center of the liquid crystal layer of the liquid crystal display panel and the center of the liquid crystal layer of the liquid crystal parallax barrier panel. The number of the separated barrier electrodes is defined to be 10 in a case where ten barrier electrodes are formed in a region that has the width 2P and is formed by combining the barrier region and the opening region.

$$\theta B = \tan^{-1}[2P/SLg/1.5].$$

Figure 6:
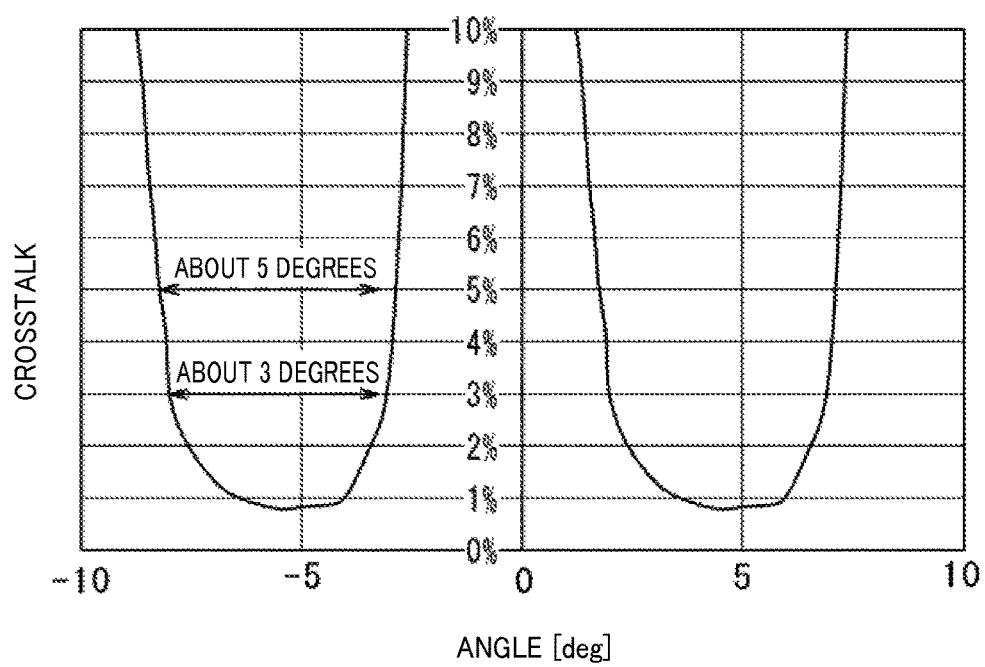
FIG. 6 is a graph illustrating dependency of crosstalk on an output angle.

The optical visual distance movement angle needs to be designed on the basis of a visual range angle. FIG. 6 is a diagram describing the visual range angle. FIG. 6 illustrates dependency of crosstalk on an output angle. In FIG. 6, the abscissa represents the angle with respect to a normal direction of the liquid crystal parallax barrier panel, and the ordinate represents the amount of crosstalk. In FIG. 6, two graphs on the positive and negative sides of the angle that represent crosstalk of the right and left eyes are illustrated.

FIG. 6 indicates that an angle at which the right eye recognizes pixels for the right eye and an angle at which the left eye recognizes pixels for the left eye are 5 degrees and −5 degrees with respect to the normal direction of the panel. When the position of the barrier pattern is changed, the graphs that represent the crosstalk of the right and left eyes are shifted in the same direction in accordance with the change in the position of the barrier pattern.

In FIG. 6, a range of an output angle that causes the amount of crosstalk to be equal to or smaller than a certain value is defined as the visual range angle. The visual range angle is associated with lateral diameters of the U-shaped graphs. The visual range angle depends on the performance and structure of the barrier and the like. If the display device is formed using a product that is used in a general mobile device, the visual range angle that causes the amount of crosstalk to be equal to or smaller than 5% degrees is 5 degrees, and the visual range angle that causes the amount of crosstalk to be equal to or smaller than 3% is 3 degrees.

According to the aforementioned results, it is preferable that the following requirement be satisfied.

θB≤5 degrees.

More preferably, θB≤3 degrees.

Specifically, it is preferable that the optimal visual distance movement angle be smaller than the visual range angle. Thus, even when the viewpoint changes, the crosstalk does not significantly increase. Accordingly, the number S of separated barrier electrodes preferably satisfies the following.

$$S \geq 2P/[(Lg/1.5)\tan 5]. \quad (1)$$

More preferably, $$S \geq 2P/[(Lg/1.5)\tan 3]. \quad (2)$$

The following is obtained by evaluating a representative product. As illustrated in FIG. 1, Lg is the distance between the center of the liquid crystal layer of the liquid crystal display panel and the center of the liquid crystal layer of the liquid crystal parallax barrier panel. This distance may be considered to be the total of the thickness of the opposing substrate of the liquid crystal display panel and the thickness of the middle polarizing plate. If the thickness of the opposing substrate of the liquid crystal display panel and the thickness of the barrier panel are each 0.2 mm and the thickness of the middle polarizing plate is 0.1 mm, Lg is 0.5 mm. The pixel pitches are pitches of combinations of sub-pixels of R, G, and B. If the widths of the sub-pixels are each 0.03 mm, P is 0.09. If the amount of crosstalk is acceptable up to 5%, θB is 5 degrees where tan 5 is 0.09.

When these values are substituted into Inequality (1), 0.09×2/[(0.5/1.5)×0.09]=6. Similarly, when these values are substituted into Inequality (2), the result is 10.8, since tan 3 is 0.05. Specifically, if the amount of crosstalk is acceptable up to 5%, the number S of separated barrier electrodes is 6 or more. If the amount of crosstalk is acceptable up to 3%, the number S of separated barrier electrodes is 10 or more. The aforementioned example is a representative example. In many products using parallax barriers, dimensions slightly vary, but the amount of cross talk can be suppressed to 5% or less by setting the number of separated barrier electrodes to 6 or more and can be suppressed to 3% or less by setting the number of separated barrier electrodes to 10 or more.

The first barrier electrodes 111 and the second barrier electrodes 112 are formed of a material called transparent electrodes typified by ITO or IZO electrodes, but are not completely transparent and absorb a small amount of light. In this case, transmittances of regions in which the first barrier electrodes 111 are overlapped with the second barrier electrodes 112 are different from transmittances of regions in which the first barrier electrodes 111 avoid overlapping with the second barrier electrodes 112. Specifically, the regions of which the transmittances are small are periodically formed. In other words, the dark regions are periodically formed.

Figure 7:
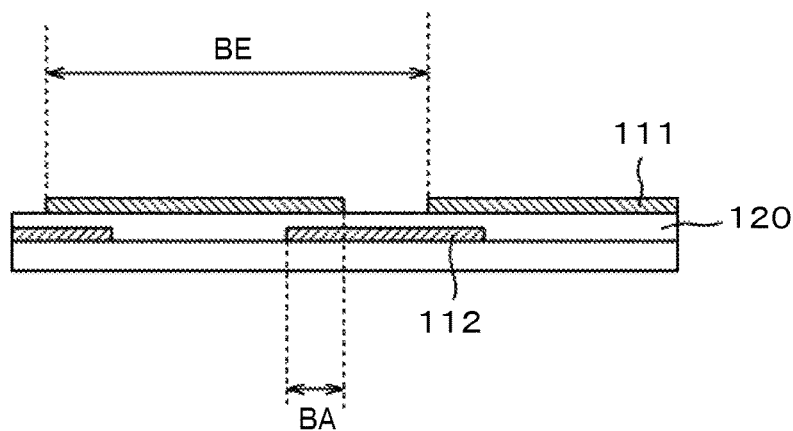
FIG. 7 is a cross-sectional diagram illustrating a relationship between first barrier electrodes and second barrier electrodes according to a first embodiment.

Moire occurs due to periodicity of the liquid crystal parallax barrier panel 10 and periodicity of the pixels of the liquid crystal display panel 20. Thus, a relationship between the moire and the widths of the regions in which the first barrier electrodes 111 are overlapped with the second barrier electrodes 112 is evaluated. FIG. 7 is an enlarged cross-sectional diagram of separated first barrier electrodes 111 and separated second barrier electrodes 112. In FIG. 7, pitches of the separated first barrier electrodes 111 are BE, and the widths of the regions in which the first barrier electrodes 111 are overlapped with the second barrier electrodes 112 are BA.

Figure 8:
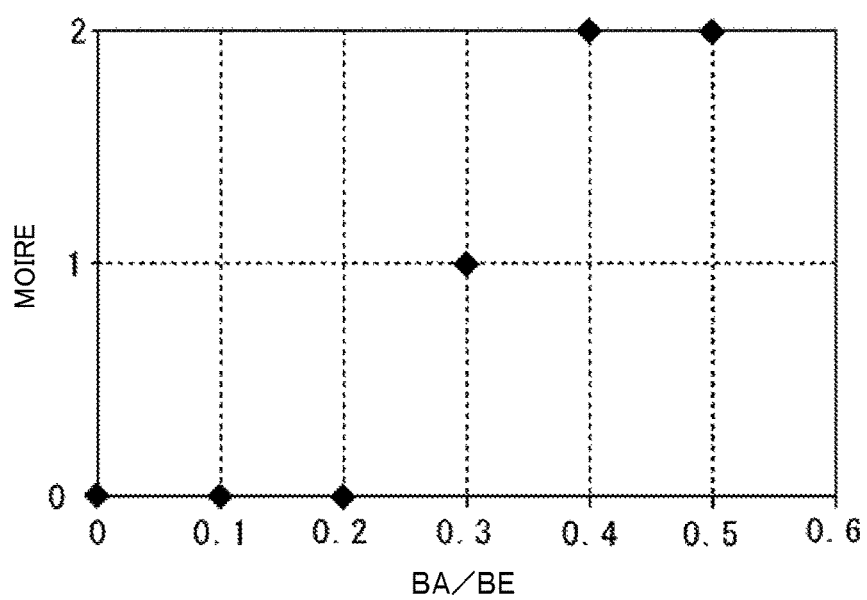
FIG. 8 is a graph showing degree of overlapping between the first and second barrier electrodes and a level of moire.

FIG. 8 is a diagram describing evaluation of a relationship between a ratio BA/BE of the widths BA to the pitches BE and the moire. In FIG. 8, the abscissa represents the ratio BA/BE, and the ordinate represents a level of the moire. The ordinate represents sensory evaluation of the moire. In FIG. 8, if the level of the moire is 2, the moire is recognizable. If the level of the moire is 1, the moire can be seen but is ignorable. If the level of the moire is 0, the moire is not visually recognizable. As is apparent from FIG. 8, if the ratio BA/BE is 0.2 or less, the moire is not recognizable. If the ratio BA/BE is 0.3 or less, the moire is practically acceptable. If the ratio BA/BE is 0.4 or larger, the moire is strong and considered to be a practically problematic region.

In the present embodiment, three-dimensional display can be achieved with less crosstalk by setting the region in which the number S of separated barrier electrodes satisfies Inequality (1) or preferably satisfies Inequality (2). In addition, if the pitches of the separated first barrier electrodes 111 are defined as BE and the widths of the regions in which the first barrier electrodes 111 overlap the second barrier electrodes 112 are defined as BA, the liquid crystal display device that suppresses the occurrence of moire, uses the liquid crystal parallax panel, and easily switches between a two-dimensional image and a three-dimensional image can be achieved by setting the ratio BA/BE to 0.3 or smaller or preferably to 0.2 or smaller. In FIG. 7, the widths of the right and left regions in which the first barrier electrodes overlap the second barrier electrodes may vary due to a variation in manufacturing or the like. In this case, the average of the widths BA of the right and left regions may be used.

Second Embodiment

A second embodiment describes a configuration of a liquid crystal parallax barrier panel in which the widths of the second barrier electrodes 112 are smaller than pitches of the separated first barrier electrodes 111. Requirements for dividing the barrier pitch 2P that is the total of the widths of the barrier region and opening region and is approximately twice as large as the pixel pitches P, using the eye tracking, and avoiding an increase in the amount of crosstalk even upon a movement of a viewpoint are the same as the first embodiment.

Figure 9:
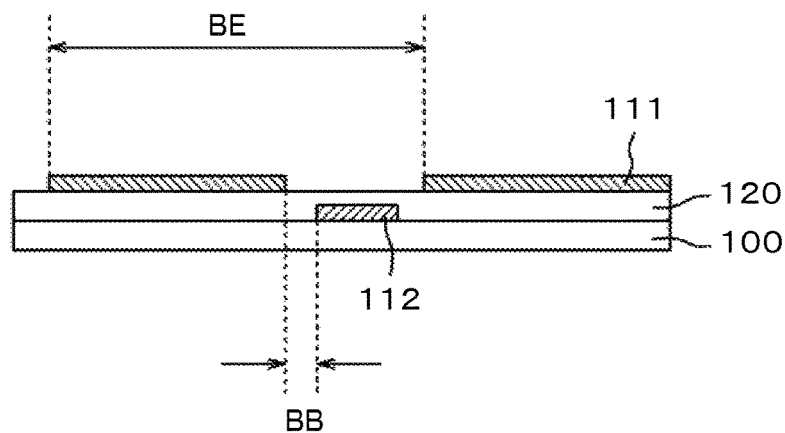
FIG. 9 is a cross-sectional diagram illustrating a relationship between the first barrier electrodes and the second barrier electrodes according to a second embodiment.

FIG. 9 is an enlarged cross-sectional diagram illustrating a relationship between the separated first barrier electrodes 111 and the separated second barrier electrodes 112. In FIG. 9, the first barrier electrodes 111 and the second barrier electrodes 112 are formed of transparent electrodes such as ITO or IZO electrodes. Since transmittances of the transparent electrodes are not 100%, a transmittance of a region in which a first barrier electrode 111 or a second barrier electrode 112 exists is different from a transmittance of a region in which a first barrier electrode 111 and a second barrier electrode 112 do not exist. Specifically, regions of which transmittances are high or bright regions are periodically formed.

If periodicity of transmittances of the liquid crystal parallax barrier panel 10 interferes with periodicity of the pixels of the liquid crystal display panel 20, moire occurs. A relationship between the moire and gaps between the first barrier electrodes 111 and the second barrier electrodes 112 is evaluated. In FIG. 9, the pitches of the first barrier electrodes 111 are BE, and the widths of the gaps between the first barrier electrodes 111 and the second barrier electrodes 112 are BB.

Figure 10:
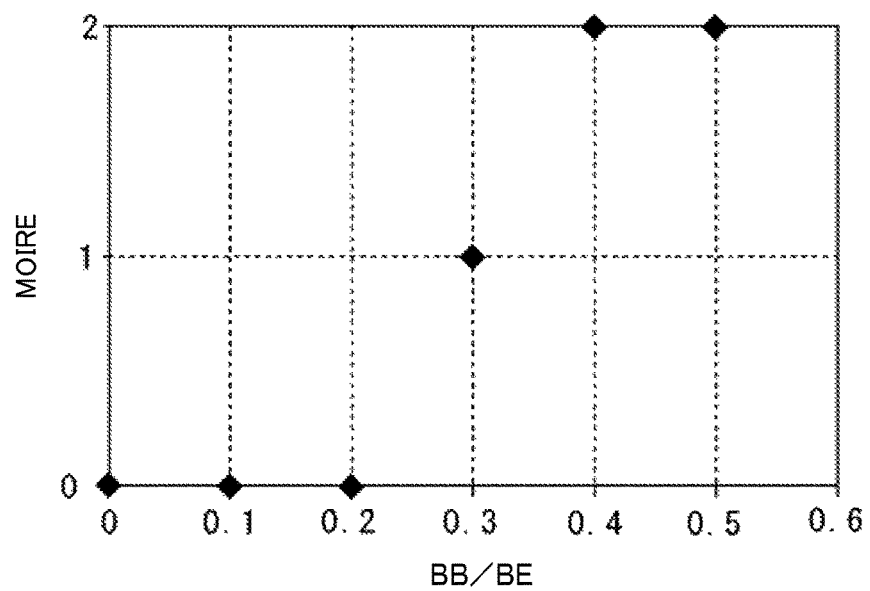
FIG. 10 is a graph showing gaps between the first barrier electrodes and the second barrier electrodes and a level of moire.

FIG. 10 is a diagram describing the evaluation of the relationship between a ratio BB/BE of the widths BB to the pitches BE and the moire. In FIG. 10, the abscissa represents the ratio BB/BE and the ordinate represents a level of the moire. The ordinate represents sensory evaluation of the moire. In FIG. 10, if the level of the moire is 2, the moire is recognizable. If the level of the moire is 1, the moire can be seen but is ignorable. If the level of the moire is 0, the moire is not visually recognizable. As is apparent from FIG. 10, if the ratio BB/BE is 0.2 or smaller, the moire is not recognizable. If the ratio BB/BE is 0.3 or smaller, the moire is practically acceptable. If the ratio BB/BE is 0.4 or larger, the moire is strong and is considered to be a practically problematic region.

In the present embodiment, three-dimensional display can be achieved with less crosstalk by setting the region in which the number S of separated barrier electrodes satisfies Inequality (1) or preferably satisfies Inequality (2). In addition, if the pitches of the separated first barrier electrodes 111 are defined as BE and the widths of the gaps between the first barrier electrodes 111 and the second barrier electrodes 112 are defined as BB, the liquid crystal display device that suppresses the occurrence of moire, uses the liquid crystal parallax panel, and easily switches between a two-dimensional image and a three-dimensional image can be achieved by setting the ratio BB/BE to 0.3 or smaller, preferably to 0.2 or smaller. In FIG. 9, the widths of the right and left gaps between the first barrier electrodes and the second barrier electrodes may vary due to a variation in manufacturing or the like. In this case, the average of the widths BB of the right and left gaps may be used.

Third Embodiment

The first and second embodiments describe the configurations in which the widths of the first barrier electrodes 111 are larger than the widths of the second barrier electrodes 112 in the barrier panel. The above description, however, is applicable to a liquid crystal parallax barrier panel in which the widths of the first barrier electrodes 111 are equal to the widths of the second barrier electrodes 112. In the configuration of the barrier electrodes illustrated in FIG. 4 according to the first embodiment, the barrier pitch 2P is separated into 10 parts by first barrier electrodes 111. Potentials of the second barrier electrodes 112 are changed in accordance with potentials of the corresponding first barrier electrodes 111.

Figure 11:
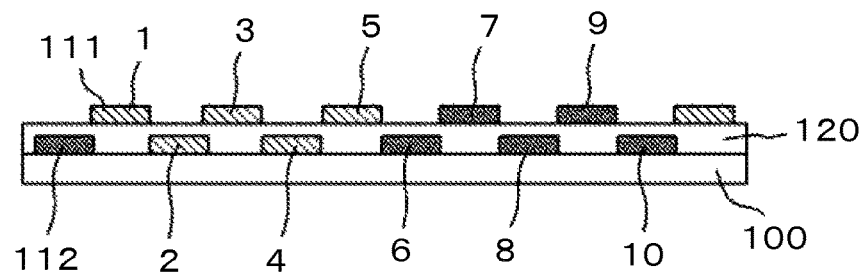
FIG. 11 is a cross-sectional diagram illustrating the first barrier electrodes and the second barrier electrodes according to a third embodiment.

In FIG. 11 illustrating a third embodiment, the barrier pitch 2P is separated into 10 parts by ten first barrier electrodes 111 and ten second barrier electrodes 112. The first barrier electrodes 111 and the second barrier electrodes 112 are independently changed in potential. A relationship between the moire and the ratio BA/BE, that is the widths BA of the regions in which the first barrier electrodes 111 are overlapped with the second barrier electrodes 112 to the pitches BE of the first barrier electrodes 111, is the same as or similar to the relationship described in the first embodiment. In addition, a relationship between the ratio BB/BE and the moire in the case where the gaps BB between the first barrier electrodes 111 and the second barrier electrodes 112 exist is the same as or similar to the relationship described in the second embodiment.

It is preferable that transmittances of the first barrier electrodes 111 with respect to white light be equal to transmittances of the second barrier electrodes 112 with respect to white light, although it is common to the first to third embodiment. If the transmittances of the first barrier electrodes 111 are different from the transmittances of the second barrier electrodes 112, periodicity of the transmittances occurs and causes moire. It may be difficult to completely match the transmittances of the first barrier electrodes 111 with the transmittances of the second barrier electrodes 112 due to a variation in manufacturing. In this case, it is preferable that the transmittances of the first barrier electrodes 111 with respect to white light and the transmittances of the second barrier electrodes 112 with respect to white light match each other or be different by 5% or less.

If a material of the first barrier electrodes 111 is the same as a material of the second barrier electrodes 112, the transmittances of the first and second barrier electrodes 111 and 1121 are determined according to the thicknesses of the first and second barrier electrodes 111 and 112 in many cases. Thus, it is preferable that the thicknesses of the first and second barrier electrodes 111 and 112 match each other or be different by 10% or less if the thicknesses of the first and second barrier electrodes 111 and 112 cannot match each other. The transmittances of the barrier electrodes may vary due to a factor other than the thicknesses. Thus, even if the thicknesses of the first and second barrier electrodes 111 and 112 match each other or are different by 10% or less, the transmittances of the first and second barrier electrodes 111 and 112 can match each other or be different by 5% or less.

If the material of the first barrier electrodes 111 or transparent electrodes is different from the material of the second barrier electrodes 112 or transparent electrodes, it is preferable that the transmittances of the first barrier electrodes 111 match the transmittances of the second barrier electrodes 112 as much as possible and the occurrence of periodicity of brightness variations be prevented.

The aforementioned embodiments each describe an example in which both side portions of the first barrier electrodes are overlapped with the second barrier electrodes or there are gaps between the first barrier electrodes and the second barrier electrodes. The principle described in the embodiments, however, is applicable to a case where one side portion of each first barrier electrode 111 overlaps a second barrier electrode 112 and there is a gap between the other side portion of the first barrier electrode 111 and a second barrier electrode 112.

Although the example in which the liquid crystal display panel is used as the display panel is described, the invention is applicable to a case where the display panel is an organic electroluminescence display panel.

What is claimed is:

1. A three-dimensional display device comprising:
    a display panel; and
    a liquid crystal parallax barrier panel arranged on the display panel, the liquid crystal parallax barrier panel changing positions of its barriers in accordance with a change in positions of viewer's eyes, wherein:
    the display panel includes pixels arranged at a first pitch of P in a first direction, the pixels each having a first sub-pixel, a second sub-pixel, and a third sub-pixel which are arranged in the first direction;
    on the liquid crystal parallax barrier panel, the barriers extend in a second direction perpendicular to the first direction and are arranged at a second pitch in the first direction;
    the barriers of the liquid crystal parallax barrier panel include
    first barrier electrodes extending in the second direction and arranged in the first direction at a pitch of BE, and
    second barrier electrodes extending, under the first barrier electrodes through an insulating layer disposed therebetween, in the second direction and arranged at a pitch of BE in the first direction;
    when a number of first barrier electrodes in 2P among the first barrier electrodes is defined as S, and a distance between the center of a liquid crystal layer of the liquid crystal display panel and the center of a liquid crystal layer of the liquid crystal parallax barrier panel is defined as Lg, $S \geq 2P/[(Lg/1.5)\tan 5]$ is satisfied;
    the second barrier electrodes are formed to be overlapped with the first barrier electrodes in the first direction; and
    when a width that each of the first barrier electrodes overlaps with each of the second barrier electrodes is defined as BA, a ratio BA/BE is 0.3 or smaller.

2. The three-dimensional display device according to claim 1, wherein when the number of the first barrier electrodes in 2P is defined as S and the distance between the center of the liquid crystal layer of the liquid crystal display panel and the center of the liquid crystal layer of the liquid crystal parallax barrier panel is defined as Lg, $S \geq 2P/[(Lg/1.5)\tan 3]$ is satisfied.

3. The three-dimensional display device according to claim 1, wherein the ratio BA/BE is 0.2 or smaller.

4. The three-dimensional display device according to claim 2, wherein the ratio BA/BE is 0.2 or smaller.

5. The three-dimensional display device according to claim 1, wherein a thicknesses of the first barrier electrodes and a thicknesses of the second barrier electrodes match each other or are different by 10% or less.

6. The three-dimensional display device according to claim 1, wherein transmittances of the first barrier electrodes with respect to white light and transmittances of the second barrier electrodes with respect to white light match each other or are different by 5% or less.

* * * * *